G. P. THOMPSON.
SILO.
APPLICATION FILED SEPT. 13, 1919.

1,366,974.

Patented Feb. 1, 1921.
5 SHEETS—SHEET 2.

INVENTOR.
GEORGE P. THOMPSON.
BY HIS ATTORNEYS.

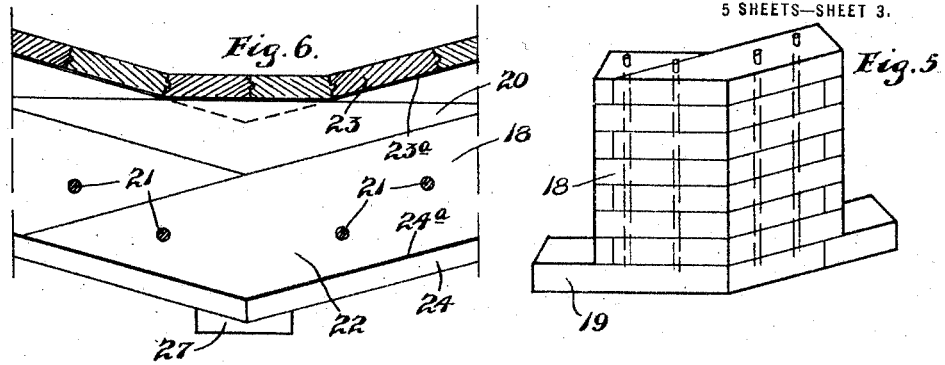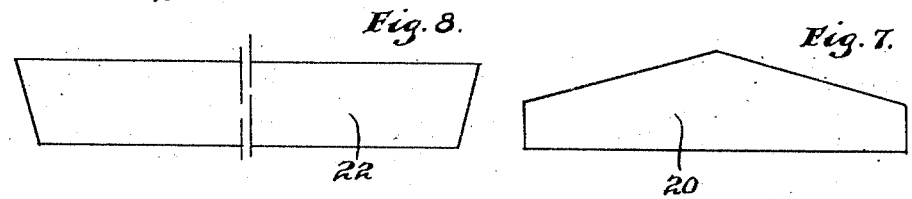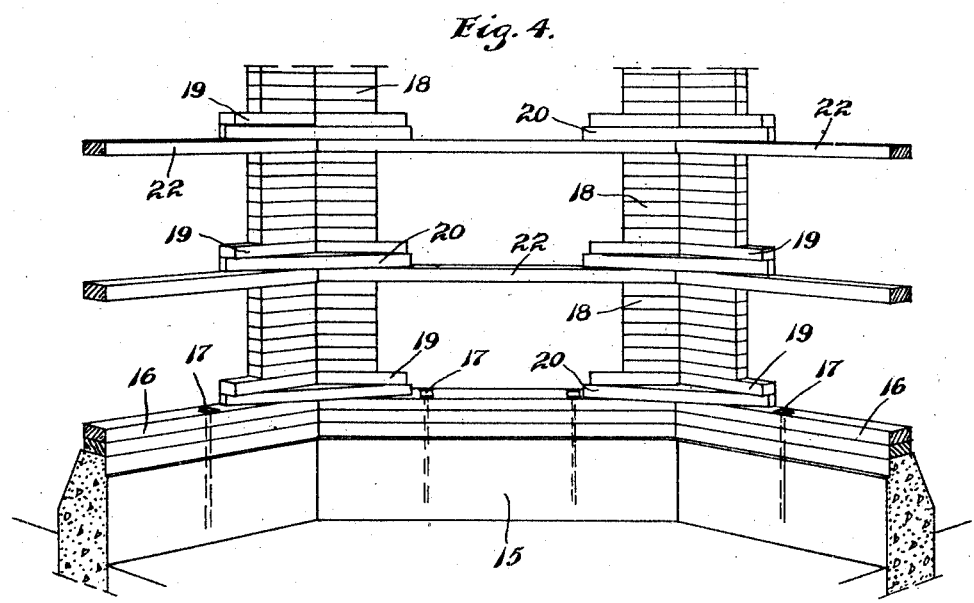

G. P. THOMPSON.
SILO.
APPLICATION FILED SEPT. 13, 1919.
1,366,974.
Patented Feb. 1, 1921.
5 SHEETS—SHEET 4.
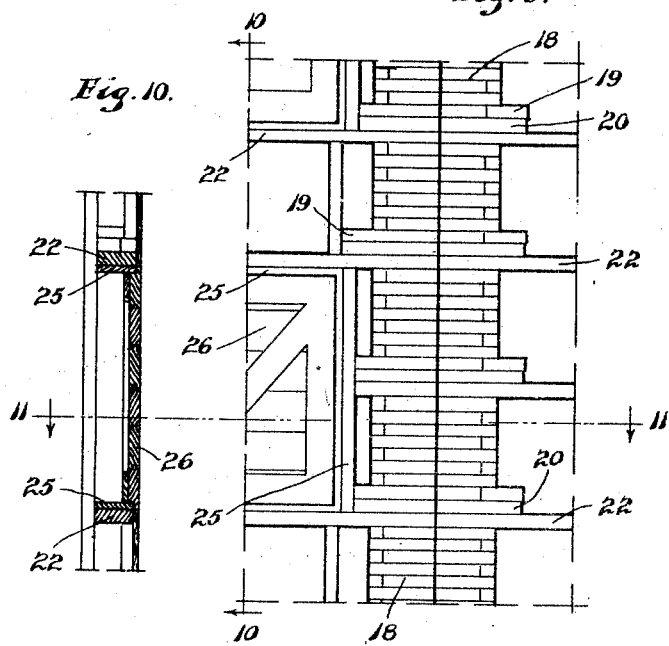
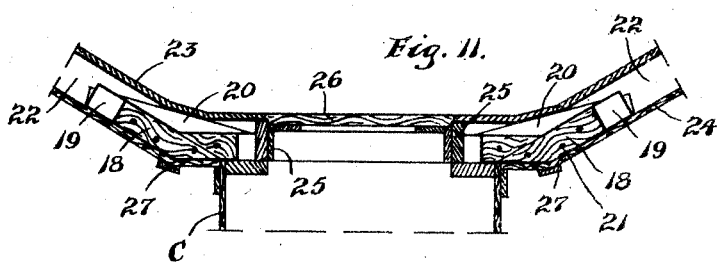
INVENTOR.
GEORGE P. THOMPSON,
BY HIS ATTORNEYS.

INVENTOR.
GEORGE P. THOMPSON.
BY HIS ATTORNEYS.

UNITED STATES PATENT OFFICE.

GEORGE P. THOMPSON, OF MINNEAPOLIS, MINNESOTA.

SILO.

1,366,974.  Specification of Letters Patent.  Patented Feb. 1, 1921.

Application filed September 13, 1919. Serial No. 323,553.

*To all whom it may concern:*

Be it known that I, GEORGE P. THOMPSON, a citizen of the United States, residing at Minneapolis, in the county of Hennepin and State of Minnesota, have invented certain new and useful Improvements in Silos; and I do hereby declare the following to be a full, clear, and exact description of the invention, such as will enable others skilled in the art to which it appertains to make and use the same.

My invention relates to the construction of buildings for containing ensilage, grain and various other things, but is directed particularly to the provision of an improved silo, and for convenience in this specification and in the claims, the term "silo" is used in a broad sense, as inclusive of buildings generally of the type indicated.

Generally stated, the invention consists of the novel construction and combination of parts hereinafter described and defined in the claims.

Stated in a general way, the objects of the invention are to provide a highly efficient, low cost wooden silo, but stated more in detail, the main objects are as follows:

To produce a silo that can be constructed chiefly of short length lumber or materials, such as are usually treated as waste materials at the mill that go into the furnace or are sold for fuel.

To provide a silo construction in which the lumber or materials can be cut to length, and to a considerable extent, built up or assembled at the mill, and the mill made parts so constructed that they may be easily assembled and the silo quickly erected, on the farm, or elsewhere, by ordinary farm help or other unskilled labor.

To provide a silo which, when erected, would be a strong, self-sustaining structure, without the use of metallic hoops and certain other metallic parts usually required in silo construction, and which would not require frequent adjustment to compensate for shrinkage or expansion under varying weather conditions.

The above objects I attain in my improved silo.

The shortage of skilled labor where silos must be erected and, in fact, the general shortage of labor of all kinds, make it not only economical, but generally desirable that as much of the work as possible be done at the mill. In my improved silo, almost all of the work is done at the mill and the erection of the properly cut and made elements requires but little labor, and this can be performed by almost any class of laborer. In silos that have been made and commercially sold the longest materials used, except the inside lining, are four feet, and a large part of the silo made from pieces as short as sixteen inches; and it is well known that lumber of such length has, ordinarily, very little commercial value. The silo is polygonal, and while the number of sides may be varied, we have found it desirable to make the silo with twelve sides, as this gives a silo of good capacity with short length lumber and with very obtuse angles, so that the silo quite closely approximates a cylindrical form.

The commercial silo is illustrated in the accompanying drawings wherein like characters indicate like parts throughout the several views. Referring to the drawings:—

Fig. 4 is a perspective view showing a part of the base and a part of the framework or skeleton of the silo;

Fig. 5 is a perspective view of one of the corner blocks of the silo skeleton;

Fig. 6 is a plan view of the corner blocks shown in Fig. 5;

Fig. 7 is a plan view of one of the elements of the corner blocks;

Fig. 8 is a plan view of one of the main ties of the framework;

Fig. 9 is an elevation showing a section of the framework and particularly illustrating one of the corner posts and door structure;

Fig. 10 is a vertical section on the line 10—10 of Fig. 9;

Fig. 11 is a horizontal section on the line 11—11 of Figs. 9 and 10 but with the door removed;

Preferably, the silo will be erected upon a suitable concrete base 15 which, of course, will be made at the place of erection.

Figure 1:
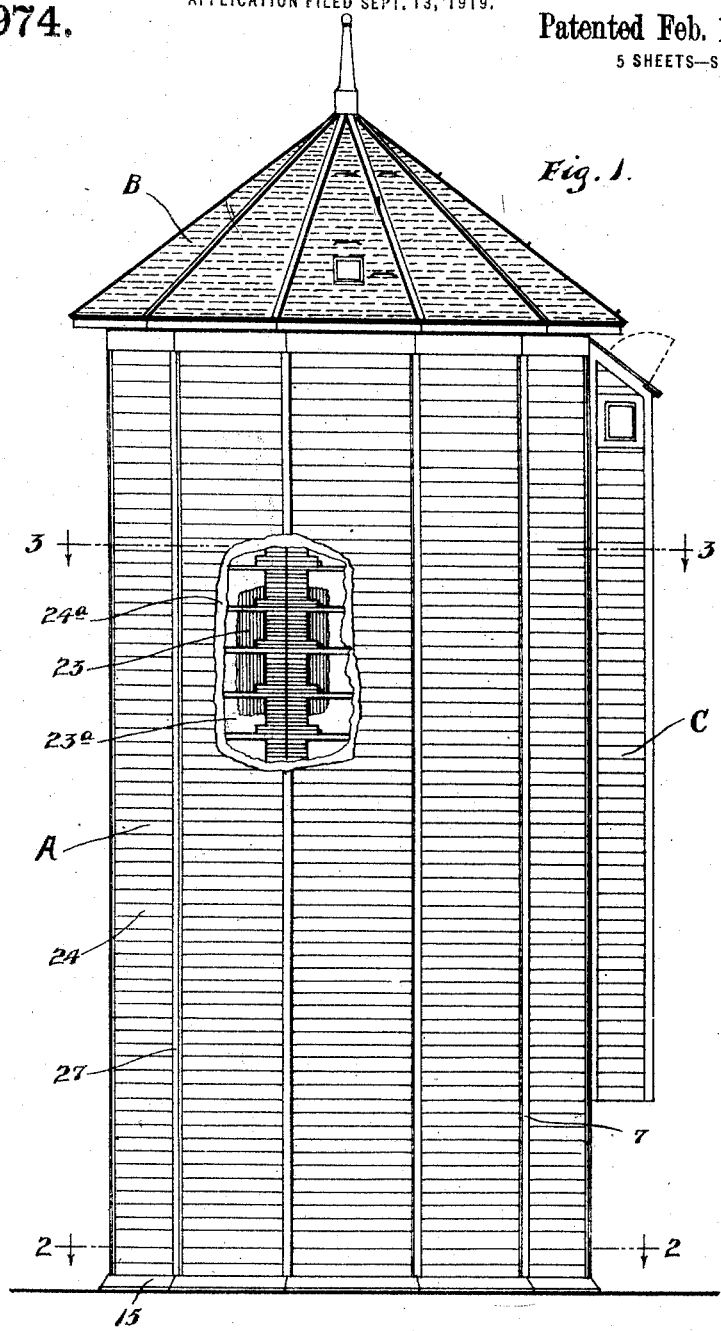
Figure 1 is a perspective view with some parts broken away, showing a commercial silo embodying my invention.
Figure 2:
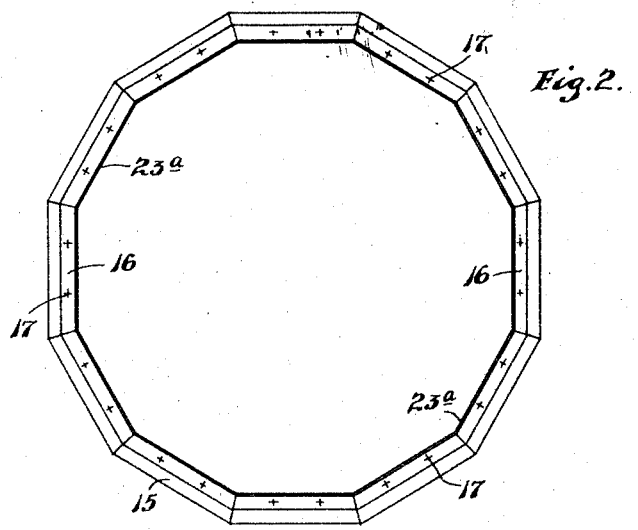
Fig. 2 is a diagrammatic horizontal section on the line 2—2 of Fig. 1.
Figure 3:
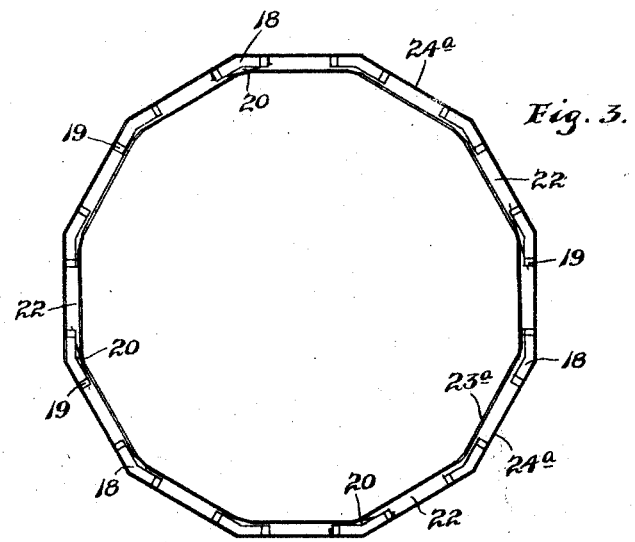
Fig. 3 is a diagrammatic horizontal section on the line 3—3 of Fig. 1.
Figure 12:
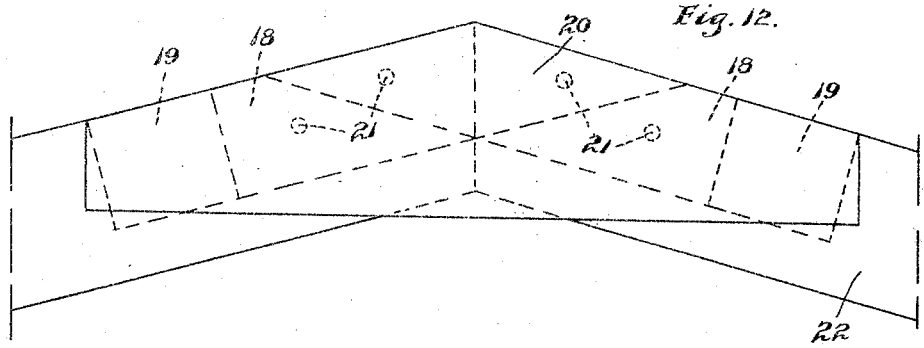
Fig. 12 is an enlarged plan view of one of the corner blocks and connected across main ties.

In Fig. 1, the main body of the silo is indicated, as an entirety, by the character A and its roof structure by the character B. The top structure may be of any suitable construction and will not be herein described in detail. The character C indicates the door housing which need not be here further considered. The silo body or wall structure which involves the novel features of my invention, as embodied in the commercial silo is as follows:

This concrete base or foundation 15, as shown, is a twelve-sided polygon. On top of the foundation 15 is laid a wooden sill 16 which, in the commercial silo, has usually been 2x6's, four feet long. This sill is preferably anchored to the foundation by anchor bolts 17. The corner posts of the silo, of which, of course, in the twelve-sided structure, there will be twelve such posts, are made up, each of a plurality of superimposed so-called corner blocks. Each such corner block is shown as made up of a plurality of short timbers 18, 19 and 20. In the commercial silo the timbers 18 are made from sixteen inch 2x4's the ends of which are beveled, as shown in the drawings, and one member of each layer of which is cut shorter than the other (see particularly Figs. 5 and 6). The timbers 18 in the different layers are alternately lapped, that is, long members 18 and adjacent members are alternated to form lapped joints. The timbers 19 are preferably 2x6's, one longer than the other and the longest being about twenty-four inches. In each block there is preferably one timber 20, two timbers 19 and a plurality of superimposed short timbers 18. The timbers 18 and 19 are alternately lapped at their ends in a sort of a dove-tailed fashion and they form the corner block with diverging sides. The base timber 20 affords a corner cross tie and extends on a chord of the arc of the general outline of the interior of the silo, or, in other words, extends across the angle at the corner. In a twelve-sided structure, the one side deviates from alinement with the other to the extent of thirty degrees, or, in other words, adjacent sides of the silo are at an angle of 150 degrees. The cross corner ties 20 reduce the angle at the interior of the silo by one-half, that is, they form the interior of the silo with wall supporting surfaces that more closely approximate a cylinder or round structure. This is important, as will be noted when the manner, hereinafter described, of applying the inner lining of the silo is considered.

Figure 13:
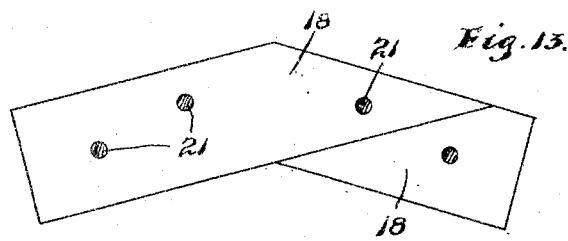
Figs. 13 and 14 are plan views of a corner block with some parts removed.
Figure 14:
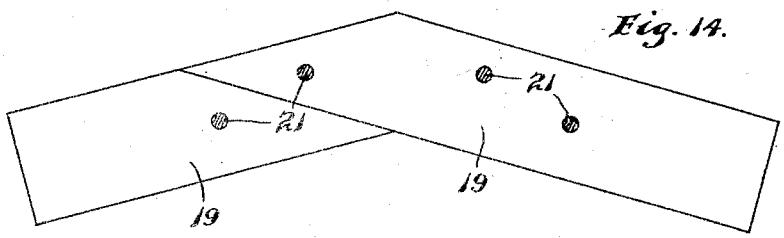

At the factory, the timber or block-forming elements 18 and 19 are formed with their beveled ends so that they overlap, as best shown in Figs. 5, 13 and 14, and by a suitable machine, they are doweled together by the application of strong wooden dowel pins driven through suitable holes bored in their said timbers, thus formed into solid individual corner blocks.

Extending between posts and seated on the tops of the several blocks thereof, are main, horizontally extended wall ties 22, which, in the commercial silo, have usually been 2x6's four feet in length. The abutting ends of these wall ties 22, like the ends of the block timbers, are beveled, and they are formed with holes or dowel seats with which the upwardly projected ends of the dowel pins 21 of the several blocks engage. The dowel pins may in some cases be extended down into the corner ties 20. The corner ties of the lowermost corner blocks rest on the sills 16 and they may be connected thereto by dowels, nails, or otherwise, in fact, nails may be used to further secure the lower block timbers 19 to the corner ties 20, and the latter to the main wall ties 22, if desired, but nailing is not a necessity with this silo as the parts interlock and will be held together as will presently more fully appear.

The interior of the skeleton frame described is covered with an inside lining 23 which preferably consists of flooring extended vertically and nailed to the main wall ties 22 and to the corner ties 20. It is also advisable to place heavy saturated paper 23ª back of the interlining or flooring 23.

The outer wall covering is preferably drop-siding of four foot lengths extended horizontally and nailed to the built-up or composite corner blocks. It is also advisable to place a heavy grade of saturated paper 24ª on the inner surface of the drop siding or outer covering 24.

It is now important to note that the built-up wooden skeleton made up of the corner blocks and main wall ties, is further reinforced and braced, both by the lining 23 and by the outside covering 24. The vertically extended flooring or lining 23, especially affords vertical ties between the vertically spaced main wall ties 22 and the corner blocks that make up the corner posts; and the drop siding of the outer covering operate as horizontal ties to tie together the corner blocks and to increase the tensile strength of the silo in a horizontal circumferential direction. Thus, by the manner of applying the boards of the lining and covering of the silo, the skeleton elements are tied together independently of their primary connections, or the connections used in erection of the skeleton, and which latter connections, in themselves, are very firm and self-sustaining. The silo erected as described, has, therefore, great strength in all directions, to wit, it will stand the outward bulging pressure of a full load and will be strong against wind or external pressure.

The door section of the silo may be identical in most respects with the other sections of the silo, but, in practice, we have formed the door openings by leaving out some of the main ties 22 and inserting suitable door frames 25 in which suitable doors 26 have been mounted. To prevent weakening of the wall because of certain omitted wall ties 22, those employed may be of heavier lumber or may be reinforced by other strips, but this door structure may be greatly varied, so far as my present invention is concerned.

Preferably, vertical joint strips or cleats 27 are applied at the corners of the silo over the joints between the abutting ends of the drop siding 24.

What I claim is:

1. A building skeleton comprising laterally spaced vertically extended columns and horizontally extended vertically spaced tie timbers, said columns being individually made up of superimposed timbers laid in tiers, the end of said horizontal tie timbers being rigidly connected to said columns and spacing the same, in combination with a wall covering applied to said skeleton.

2. A silo skeleton comprising laterally spaced vertically extended columns and horizontally extended vertically spaced tie timbers, said columns being individually made up of superimposed timbers laid in tiers, the ends of said horizontal tie timbers being interposed between timbers of said columns and rigidly incorporated therewith in the columns, in combination with a wall covering applied to said skeleton.

3. A silo skeleton comprising circumferentially vertically extended columns and horizontally extended vertically spaced tie timbers, said columns being made up of superimposed blocks, said blocks being made up individually of timbers laid in tiers with beveled ends lapped in alternate order, said blocks at their bases having angular cross corner ties which at their ends project beyond the superimposed timbers of said blocks, and the ends of said tie timbers being interposed between the blocks of said columns and rigidly connected directly to the cross corner ties thereof, in combination with a wall covering applied to said skeleton.

4. A polygonal silo frame comprising columns and vertically spaced horizontal frame ties connecting said columns, said columns being made up of superimposed blocks, the said blocks being made up of timbers laid in tiers with lapped ends, and dowel pins passed through the timbers of said blocks and locking the same together, the ends of said dowel pins being projected and seated in the ends of said main ties.

5. A polygonal silo frame comprising columns and vertically spaced horizontal frame ties connecting said columns, said columns being made up of superimposed blocks, and the said blocks being made up of timbers laid in tiers with lapped ends, the lower members projecting beyond the body forming upper members, the ends of said wall ties being located between the tops of underlying blocks and the long lower members of overlying blocks.

6. A polygonal silo frame comprising columns and vertically spaced horizontal frame ties connecting said columns, said columns being made up of superimposed blocks, and the said blocks being made up of timbers laid in tiers with lapped ends, the lower members projecting beyond the body forming upper members, the ends of said wall ties being located between the tops of underlying blocks and the long lower members of overlying blocks, the members of said blocks being connected by dowel pins passed vertically therethrough.

7. A polygonal silo frame comprising columns and vertically spaced horizontal frame ties connecting said columns, said columns being made up of superimposed blocks, the said blocks being made up of timbers laid in tiers with lapped ends, the lower members projecting beyond the body forming upper members, the ends of said wall ties being located between the tops of underlying blocks and the long lower members of overlying blocks, the members of said blocks being connected by dowel pins passed vertically therethrough, the ends of said dowel pins being projected and seated in the ends of said wall ties, and a covering applied to said frame and inclosing the openings therein to complete the wall structure.

8. A polygonal silo frame comprising columns and vertically spaced horizontal frame ties connecting said columns, said columns being made up of superimposed blocks, the said blocks being made up of timbers laid in tiers with lapped ends, the lower members projecting beyond the body forming upper members, the ends of said wall ties being located between the tops of underlying blocks and the long lower members of overlying blocks, and corner ties interposed between the abutting ends of said wall ties and the overlying blocks of said columns and cutting across the angles formed by the sides of the wall structure.

In testimony whereof I affix my signature in presence of two witnesses.

GEORGE P. THOMPSON.

Witnesses:
F. S. WADDINGTON.
L. C. SCHMALTZ.